(12) United States Patent  
Narita et al.

(10) Patent No.: US 9,330,691 B1  
(45) Date of Patent: May 3, 2016

(54) MICROWAVE ASSISTED MAGNETIC HEAD (71) Applicant: Kabushiki Kaisha Toshiba, Minato-ku, Tokyo (JP)

(72) Inventors: Naoyuki Narita, Fujisawa Kanagawa (JP); Kenichiro Yamada, Tokyo (JP); Tomoko Taguchi, Kunitachi Tokyo (JP); Takuya Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/812,556

(22) Filed: Jul. 29, 2015

(30) Foreign Application Priority Data

Apr. 17, 2015 (JP) .................................. 2015-085263

(51) Int. Cl.  
 *G11B 5/127* (2006.01)
(52) U.S. Cl.  
 CPC ...................................... *G11B 5/127* (2013.01)
(58) Field of Classification Search  
 CPC ........... G11B 5/127; G11B 5/33; G11B 5/147  
 USPC ............... 360/125.3, 125.03, 125.09, 125.04, 360/125.17, 125.12, 125.06, 125.15, 360/125.26, 125.19  
 See application file for complete search history.

(56) References Cited

U.S. PATENT DOCUMENTS

| 8,654,480 B2 * | 2/2014 | Shimizu | ................. G11B 5/314 360/128 |
|---|---|---|---|
| 8,705,206 B1 * | 4/2014 | Maeda | ...................... G11B 5/23 360/119.04 |
| 8,760,806 B2 | 6/2014 | Igarashi et al. | |
| 2009/0052095 A1 | 2/2009 | Yamada et al. | |
| 2009/0080106 A1 * | 3/2009 | Shimizu | ................. G11B 5/314 360/75 |
| 2011/0205655 A1 * | 8/2011 | Shimizu | ................... G11B 5/02 360/39 |
| 2013/0028058 A1 * | 1/2013 | Yasui | .................. G11B 5/1278 369/13.14 |
| 2014/0063648 A1 | 3/2014 | Shiroishi et al. | |
| 2014/0118861 A1 | 5/2014 | Funayama | |

FOREIGN PATENT DOCUMENTS

| JP | 2009-070541 A | 4/2009 |
|---|---|---|
| JP | 2014-049145 A | 3/2014 |
| JP | 2014-086122 A | 5/2014 |
| WO | 2009-133786 A1 | 11/2009 |

* cited by examiner

*Primary Examiner* — Allen T Cao  
(74) *Attorney, Agent, or Firm* — White & Case LLP (57) ABSTRACT

According to one embodiment, a microwave assisted magnetic head includes a spin torque oscillator, and if driving current of the spin torque oscillator is zero, a magnetization direction of the spin injection layer is identical regardless of polarity of recording current, and if the driving current of the spin torque oscillator is not zero, the magnetization direction of the spin injection layer changes in response to the polarity of the recording current.

8 Claims, 13 Drawing Sheets

MICROWAVE ASSISTED MAGNETIC HEAD

CROSS-REFERENCE TO RELATED APPLICATIONS

This application is based upon and claims the benefit of priority from Japanese Patent Application No. 2015-085263, filed Apr. 17, 2015, the entire contents of which are incorporated herein by reference.

FIELD

Embodiments described herein relate generally to a microwave assisted magnetic head.

BACKGROUND

In conventionally used microwave assisted magnetic heads, a coercive force of a spin injection layer of a spin torque oscillator is set below a gap field in order to achieve good recording performance without depending on polarity of recoding current.

To increase recording density further, reduction of a write gap (WG) and increase of microwave field strength are required. That is, greater driving current is required. However, if the driving current alone is increased while the spin injection layer is formed of a material conventionally used, stable oscillation becomes difficult to achieve.

DETAILED DESCRIPTION

In general, according to one embodiment, a microwave assisted magnetic head includes a main pole, an auxiliary pole opposed to the main pole, a coil which magnetizes the main pole and the auxiliary pole, a spin torque oscillator provided between the main pole and the auxiliary pole, and a terminal which supply electricity to the spin torque oscillator.

The spin torque oscillator includes a spin injection layer, intermediate layer, and oscillation layer formed in this order on either the main pole or the auxiliary pole.

If driving current of the spin torque oscillator is substantially zero, a direction of magnetization of the spin injection layer is identical regardless of polarity of recording current. On the other hand, if driving current is not substantially zero, a direction of the magnetization of the spin injection layer changes in response to polarity of recording current.

In the microwave assisted magnetic head of the embodiment, the spin injection layer having a greater coercive force is used. Consequently, if driving current of the spin torque oscillator is zero, a direction of the magnetization of the spin injection layer is identical regardless of polarity of recording current, and if driving current is not zero, a direction of the magnetization of the spin injection layer changes in response to the polarity of the recording current. With the spin injection layer having good stability with respect to the driving current for the spin torque oscillator (STO driving current), oscillation can be generated efficiently and good assist can be expected.

Furthermore, if driving current of the spin torque oscillator is increased more, a direction of the magnetization of the spin injection layer can be reversed in response to a reversal of the polarity of the recording current. Therefore, stable recording performance can be achieved regardless of the recording polarity.

If driving current of the spin torque oscillator is substantially zero, a magnetic resistance change of the spin torque oscillator caused by a magnetic resistance effect becomes asymmetry with respect to the polarity of the recording current, and the driving current of the spin torque oscillator increases. Then, if the magnetization of the spin injection layer reverses in response to the change of the recording current of the spin injection layer, the magnetic resistance change of the spin torque oscillator caused by the magnetic resistance effect becomes symmetry with respect to the polarity of the recording current. Based on this mechanism, the suitable driving current of the spin torque oscillator can be selected.

A normal of a surface of the main pole opposed to the spin torque oscillator of the microwave assisted magnetic head can be parallel to a direction of a magnetic easy axis of the spin injection layer. The polarity of the current used for driving of the spin torque oscillator can be maintained the same constantly.

Furthermore, an average gap between the main pole and a trailing shield opposed to the main pole as being viewed from an air bearing surface can be set greater than a film thickness of the spin torque oscillator. Therefore, the spin torque oscillator can be oscillated with higher efficiency.

The product Mst of saturation magnetization Ms and film thickness t of the oscillation layer of the spin torque oscillator can be limited to a range between 25 and 40 nmT. Consequently, microwave field strength for good assist can be obtained.

The spin injection layer is formed of a material having perpendicular magnetic anisotropy, for example, an alloy containing Mn such as MnGeGa.

Hereinafter, embodiments are described with reference to accompanying drawings.

Example 1

Study in Simulation (Flat Type Recording Head)

Figure 1:
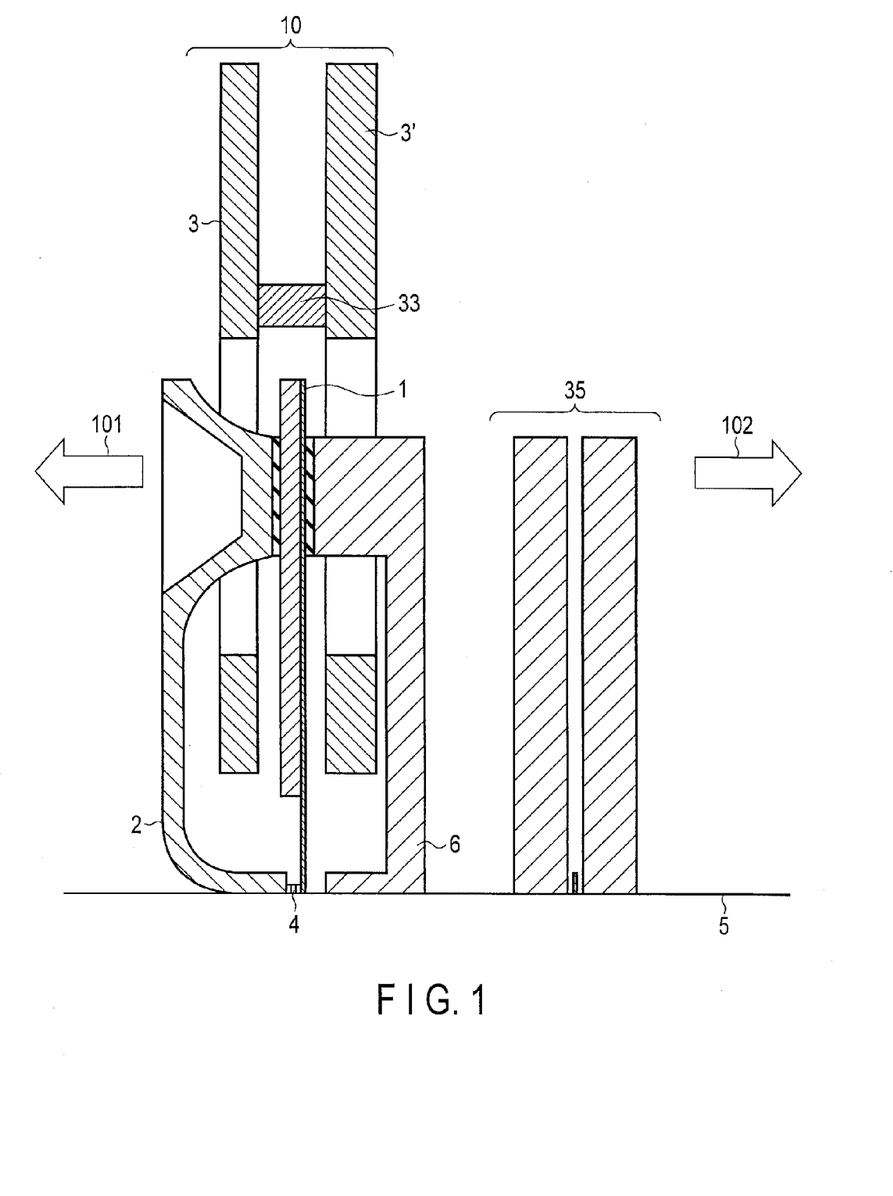
FIG. 1 is a cross-sectional view which shows main parts of a magnetic head of an embodiment.

FIG. 1 is a cross-sectional view which shows main parts of a magnetic recording and resuming head of the embodiment, as being viewed from an off-track direction.

Figure 2:
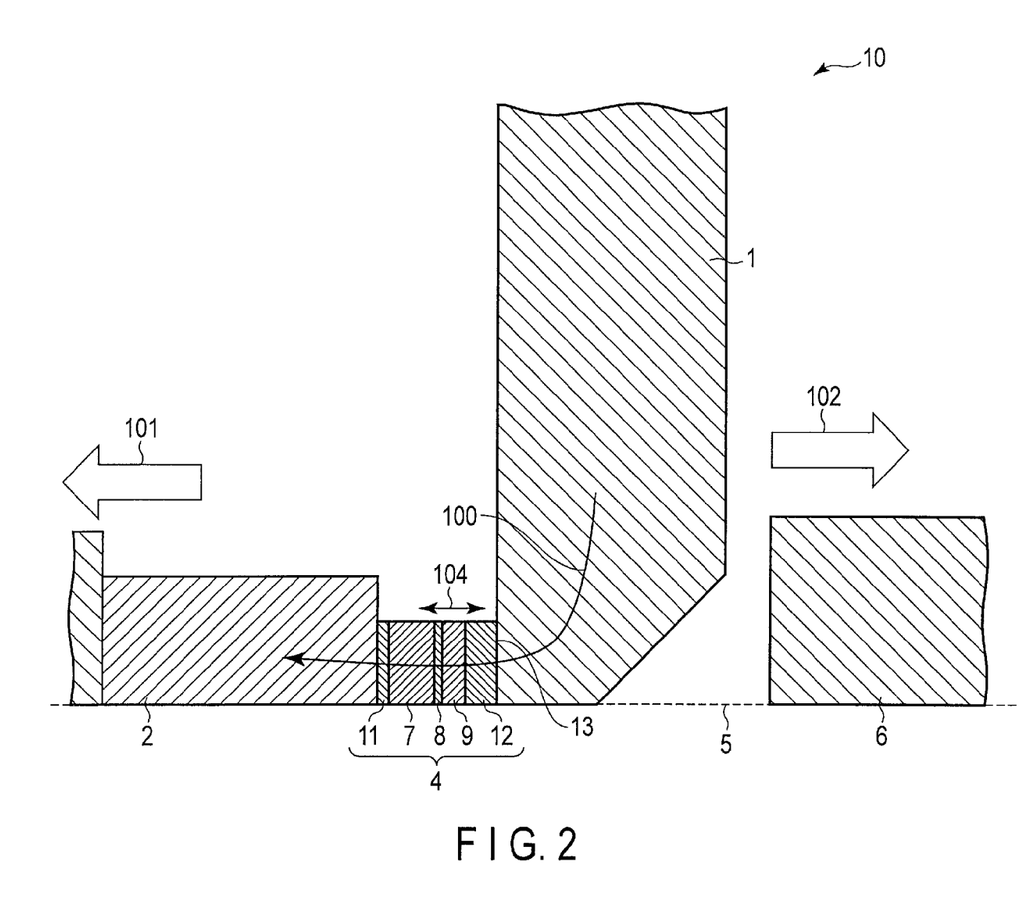
FIG. 2 is a cross-sectional view of a magnetic head of FIG. 1 focusing on an air bearing surface.

FIG. 2 is a cross-sectional view of an example of a magnetic head of the embodiment, focusing on an air bearing surface.

A magnetic head 10 includes a main pole 1, trailing shield 2 opposed to the main pole 1, pair of coils 3 and 3' which magnetizes the main pole 1 and the trailing shield 2 using current applied from a power source (not shown), an upper-and-lower coil connector 33 which connects the coil 3 to the coil 3', and spin torque oscillator 4 between the main pole 1 and the trailing shield 2 in the proximity to the air bearing surface. The magnetic head 10 is shaped such that the opposite surfaces of the main pole 1 and the spin torque oscillator 4 are perpendicular to the air bearing surface 5. The magnetic head 10 with such a write gap structure is defined as a non-tapered magnetic head. Other auxiliary poles such as a leading shield 6 shown in FIGS. 1 and 2 and a side shield (not shown) may be included in this structure. The spin torque oscillator (STO) 4 provided between the main pole 1 and the trailing shield 2 (in the write gap) is basically structured as a layered structure of an oscillation layer (FGL) 7 and a spin injection layer (SIL) 9 with a spacer layer 8 interposed therebetween. Furthermore, the STO 4 is electrically connected to the main pole 1 and trailing shield 2 by electrodes 11 and 12. In FIG. 2, in a direction from the main pole 1 to the trailing shield 2, the electrode 12, SIL 9, spacer 8, FGL 7, and electrode 11 are formed in this order, and spin torque oscillator (STO) driving current is supplied from the main pole 1 to the trailing shield 2 as indicated by arrow 100. The direction of the STO driving current may be reversed, and is optionally selected.

Furthermore, a direction of the magnetic easy axis of the spin injection layer 9 is, as indicated by arrow 104, substantially perpendicular to a main surface 13 of the main pole 1 arranged to be opposed to the STO 4. The layering order of the STO 4 may be reversed to the order shown in FIG. 2. If it is reversed, the STO driving current is supplied from the trailing shield 2 to the main pole 1. Note that the direction of the STO driving current may be reversed, and is optionally selected.

Using the following condition, an STO oscillation state was studied in simulation.

A distance between the main pole 1 and the trailing shield 2 (write gap WG) was set to 30 nm. The thickness of the STO 4 was set to be equal to the write gap. The write gap is defined as an average value obtained by dividing a distance between the main pole and the trailing shield of the magnetic head as being viewed from the ABS by a widh of the main pole in an off-track direction of the main surface 13. Here, a gap field applied to a thickness direction of the FGL (field strength in the write gap) was 9 kOe. The thickness of the FGL was 13.0 nm, and saturation magnetization (Ms) was 2.3 T, and in this case, the magnetic film thickness Mst as a product of the thickness of the FGL and saturation magnetization was 29 nmT. The STO driving current is supplied from the main pole 1 to the trailing shield 2. The microwave field strength generated from the FGL is, in theory, in proportion to the magnetic film thickness of the FGL, and therefore, in general, the FGL can have greater magnetic film thickness. For anisotropy field Hk of the SIL, there were two values adopted: 30 and 22 kOe. The SIL was formed of an MnGeGa alloy, for example.

Furthermore, an area of the surface of which normal is a film thickness direction of the FGL was set 40×40 nm$^2$ in both the FGL and the SIL.

Furthermore, the following two conditions were simulated for comparison purpose.

Comparative Example 1

The structure of Example 1 was used except that the distance between the main pole and the trailing shield (WG) was 45 nm and Hk of the SIL was 15 kOe.

Comparative Example 2

The structure of Example 1 was used except that the distance between the main pole and the trailing shield (WG) was 30 nm and Hk of the SIL was 15 kOe.

The oscillation state of the FGL was evaluated using a bias point (B.P.). B.P. is derived from the following formula 1 where a relative angle between the FGL magnetization and the SIL magnetization is θ.

$$B.P.=(1-\cos\theta)/2 \qquad 1$$

That is, if B.P.=0 (θ=0°), the FGL magnetization and the SIL magnetization are in the same orientation. If B.P.=1 (θ=180°), the FGL magnetization and the SIL magnetization are in an antiparallel relationship. Furthermore, if B.P.=0.5, the FGL magnetization is perpendicular to the SIL magnetization, and in this case, the microwave field strength generated from the FGL becomes maximum. To obtain good assist, highly efficient oscillation of the FGL is essential, and B.P. can be above 0.35, further can be close to 0.5.

Figure 3:
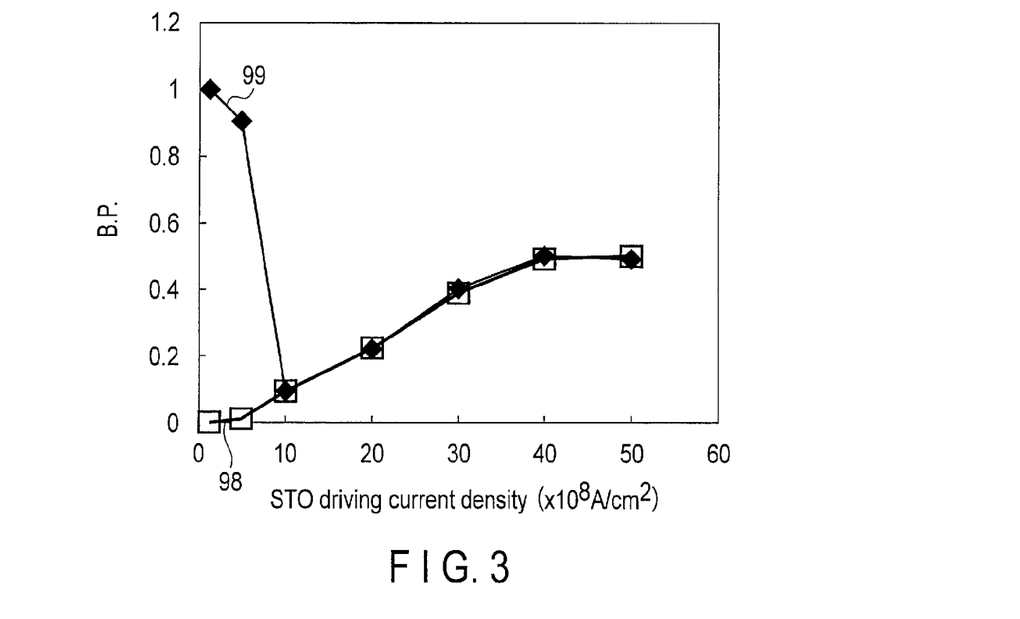
FIG. 3 shows a relationship between spin torque oscillator (STO) driving current density and bias point (B.P.) as to the magnetic head of the embodiment.
Figure 4:
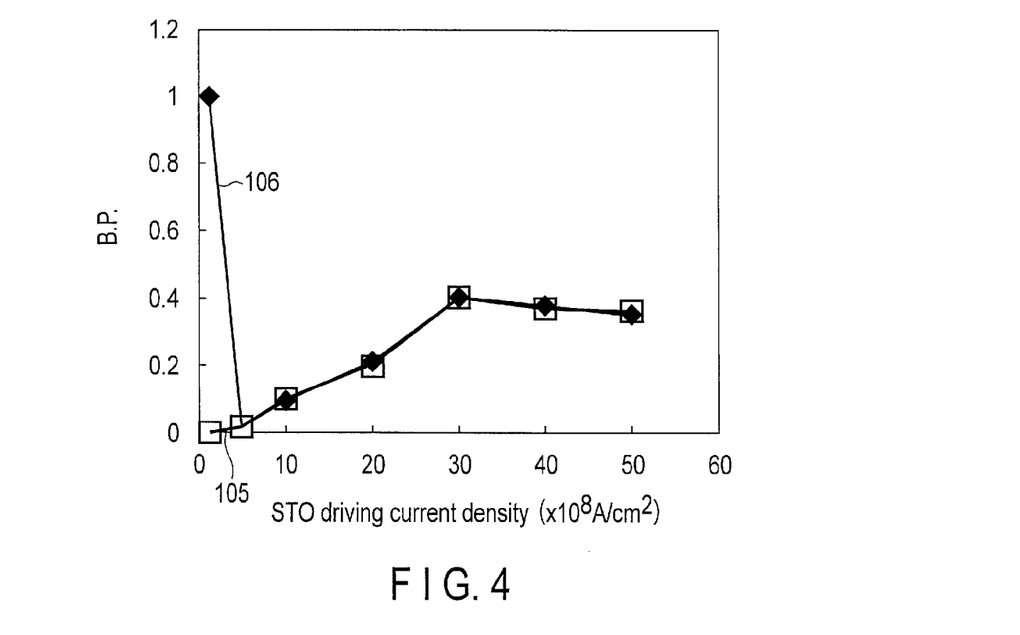
FIG. 4 shows a relationship between STO driving current density and B.P. as to the magnetic head of the embodiment.

FIGS. 3 and 4 are graphs each showing a relationship between STO driving current density and B.P. derived through simulation as to the magnetic head of Example 1.

FIG. 3 shows a case where the anisotropy field Hk of the SIL is 30 kOe, and FIG. 4 shows a case where the anisotropy field Hk of the SIL is 22 kOe.

In the figures, a gap field applied in the same direction with respect to the initial magnetization of the SIL is defined as positive recording current which is indicated by graph 98 in FIG. 3 and graph 105 in FIG. 4. A gap field applied in the opposite direction with respect to the initial magnetization of the SIL is defined as negative recording current which is indicated by graph 99 in FIG. 3 and graph 106 in FIG. 4.

As shown in FIGS. 3 and 4, if Hk of the SIL is 30 or 22 kOe and the STO driving current density is substantially zero, the coercive force of the SIL is extremely high, and the SIL takes two states depending on polarity of recording current, that is, B.P.=0 when recording current is positive and B.P.=1 when recording current is negative. This means that the magnetization of the SIL is not changed by the gap field. When the STO driving current density increases, B.P. decreases, and as the density increases, B.P. comes to indicate the same value regardless of the polarity of recording current. This means that the magnetization of the SIL has been reversed corresponding to the polarity change of the gap field. Graphs 98 and 99 substantially match when the STO driving current density is greater than or equal to $10\times10^8$ A/cm². Similarly, graphs 105 and 106 substantially match when the STO driving current density is greater than or equal to $5\times10^8$ A/cm². If the STO driving current density is greater than the condition described above, a mag-flip of the STO can be performed. The mag-flip is an STO function to reverse magnetization of the SIL to correspond to polarity of recording current, and an STO which uses the mag-flip can achieve excellent magnetic recording without depending on polarity of recording current even if the STO driving current constantly has the same polarity.

Furthermore, when Hk of the SIL is either 22 or 30 kOe, B.P. increases as the STO driving current density increases, and when the STO driving current density≥$30\times10^8$ A/cm², good oscillation of B.P.≥0.35 is obtained, and excellent magnetic recording can be achieved.

Figure 5:
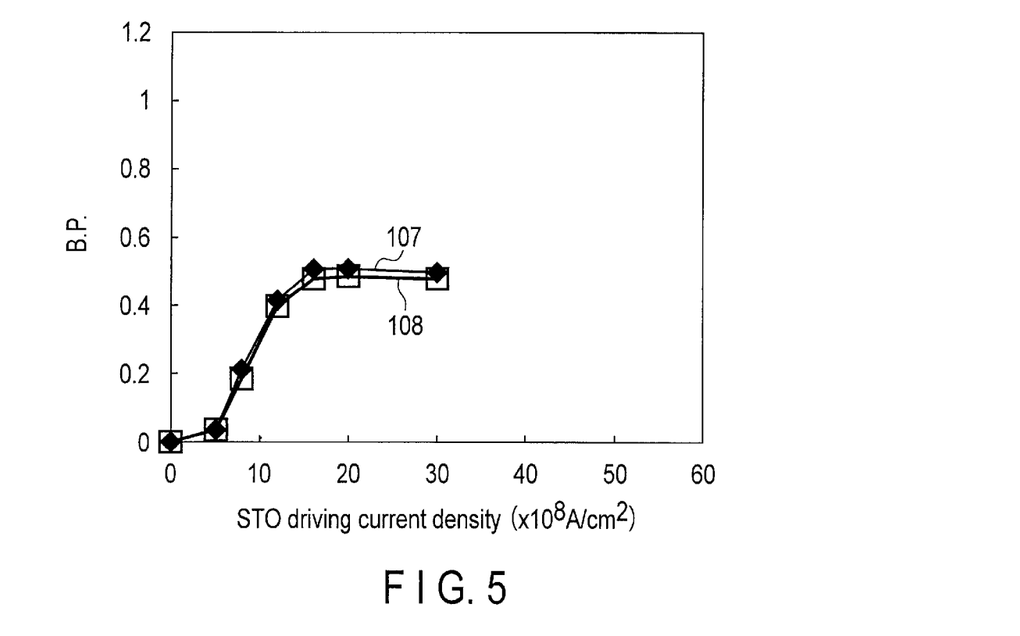
FIG. 5 shows a relationship between STO driving current density and B.P. as to a magnetic head of a comparative example.
Figure 6:
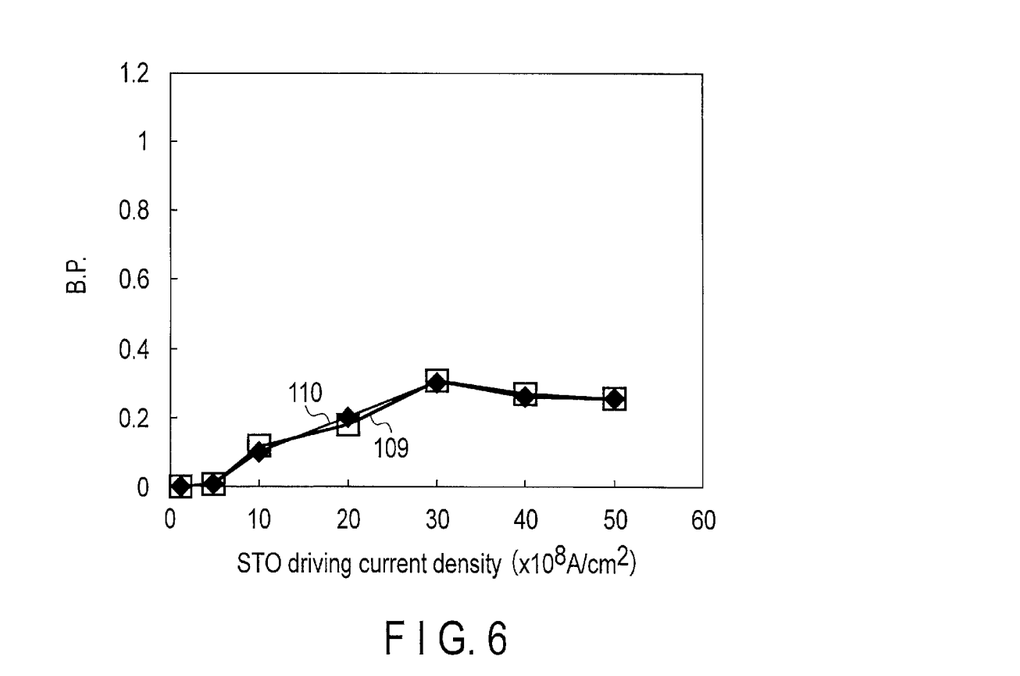
FIG. 6 shows a relationship between STO driving current density and B.P. as to a magnetic head of a comparative example.

FIGS. 5 and 6 are graphs each showing a relationship between STO driving current density and B.P. derived through simulation as to the magnetic heads of the comparative examples 1 and 2.

In FIGS. 5 and 6, graphs 107, 108, 109, and 110 all show cases where Hk of the SIL is 15 kOe. Graphs 108 and 109 show cases where polarity of recording current is positive and graphs 107 and 110 show cases where polarity of recording current is negative. In either case, if the STO driving current density is substantially zero, B.P. becomes substantially zero regardless of the polarity of recording current. This means that, even if the STO driving current density is substantially zero, the magnetization of the FGL and the magnetization of the SIL are substantially uniformly parallel to the gap field because of the reversal of the SIL magnetization by the gap field.

Furthermore, graphs 107 and 108 in FIG. 5 indicate that B.P.≥0.35 is achieved when the STO driving current density≥$10\times10^8$ A/cm²; however, the write gap is 45 nm which is relatively wide, and high track recording density is difficult to achieve.

Furthermore, graphs 109 and 110 in FIG. 6 show that the write gap is 30 nm while B.P. does not exceeds 0.35 even when the STO driving current density increases, and good assist is not expected. As can be understood from this point, the embodiment can produce highly efficient oscillation in a magnetic head which exerts high recording performance without driving an STO, that is, in a magnetic head with a narrow WG. Thus, as compared to comparative examples 1 and 2, the embodiment can achieve high recording density.

Figure 7:
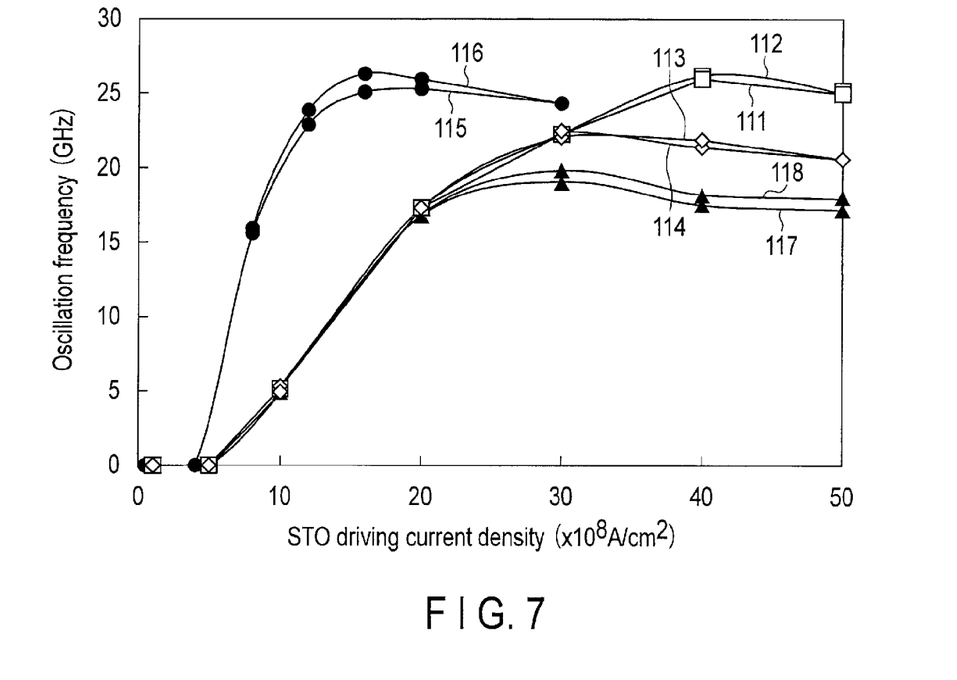
FIG. 7 shows how oscillation frequency of STO depends on STO driving current density as to the magnetic head of the embodiment.

FIG. 7 shows how the oscillation frequency of STO depends on the STO driving current density as to each of the magnetic heads of the embodiment and the comparative examples.

In the figure, each of graphs 111 and 112 shows Example 1 where the write gap is 30 nm and the anisotropy field Hk of the SIL is 30 kOe, and recording current is positive in graph 111 while it is negative in graph 112. Each of graphs 113 and 114 shows Example 1 where the write gap is 30 nm and the anisotropy field Hk of the SIL is 22 kOe, and recording current is positive in graph 113 while it is negative in graph 114.

Furthermore, each of graphs 115 and 116 shows comparative example 1 where the write gap is 45 nm and the anisotropy field Hk of the SIL is 15 kOe, and recording current is positive in graph 115 while it is negative in graph 116.

Furthermore, each of graphs 117 and 118 shows comparative example 2 where the write gap is 30 nm and the anisotropy field Hk of the SIL is 15 kOe, and recording current is positive in graph 117 while it is negative in graph 118.

As shown by graphs 111, 112, 113, and 114, the oscillation of 20 to 30 GHz which is effective for microwave assist is achieved under the condition of Example 1 as explained above.

Figure 8:
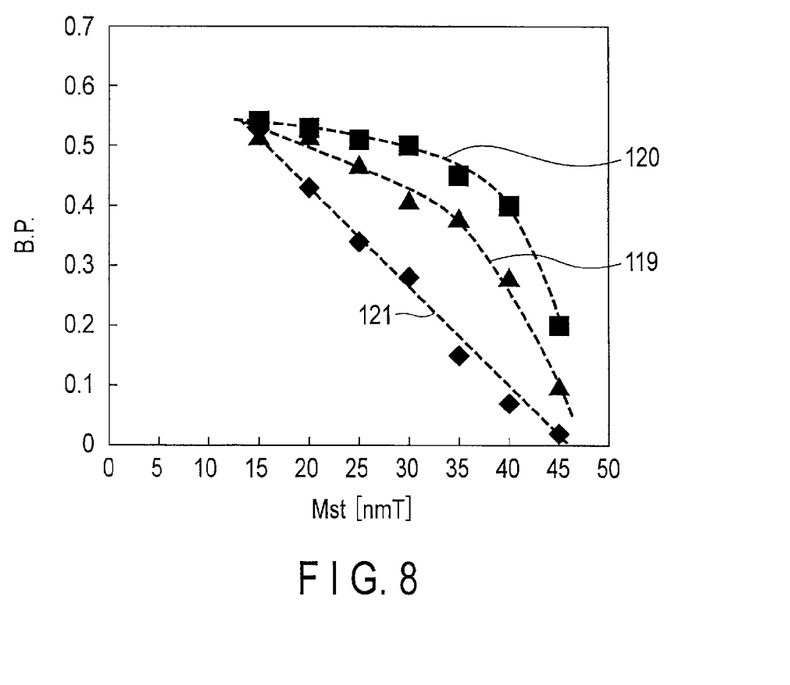
FIG. 8 shows how B.P. depends on a magnetic film thickness of FGL when STO driving current density takes an optimum value as to the magnetic head of the embodiment.

FIG. 8 shows how B.P. results when the magnetic film thickness Mst of the FGL is changed as the STO driving current density takes an optimum value as to each of the magnetic heads of the embodiment.

Graph 119 shows a case where Hk of the SIL is 22 kOe and graph 120 shows a case where Hk of the SIL is 30 kOe. Furthermore, for comparison purpose, graph 121 shows B.P. where Hk of the SIL is 15 kOe as in comparative example 2. In the case where Hk=15 kOe, B.P. is below 0.35 when the magnetic film thickness is greater than or equal to 25 nmT. On the other hand, in the case where Hk=30 kOe, B.P. is above 0.35, which means good oscillation, when the magnetic film thickness is even 40 nmT as shown by graphs 119 and 120.

Example 2

Study in Simulation (Tapered Recording Head)

Figure 9:
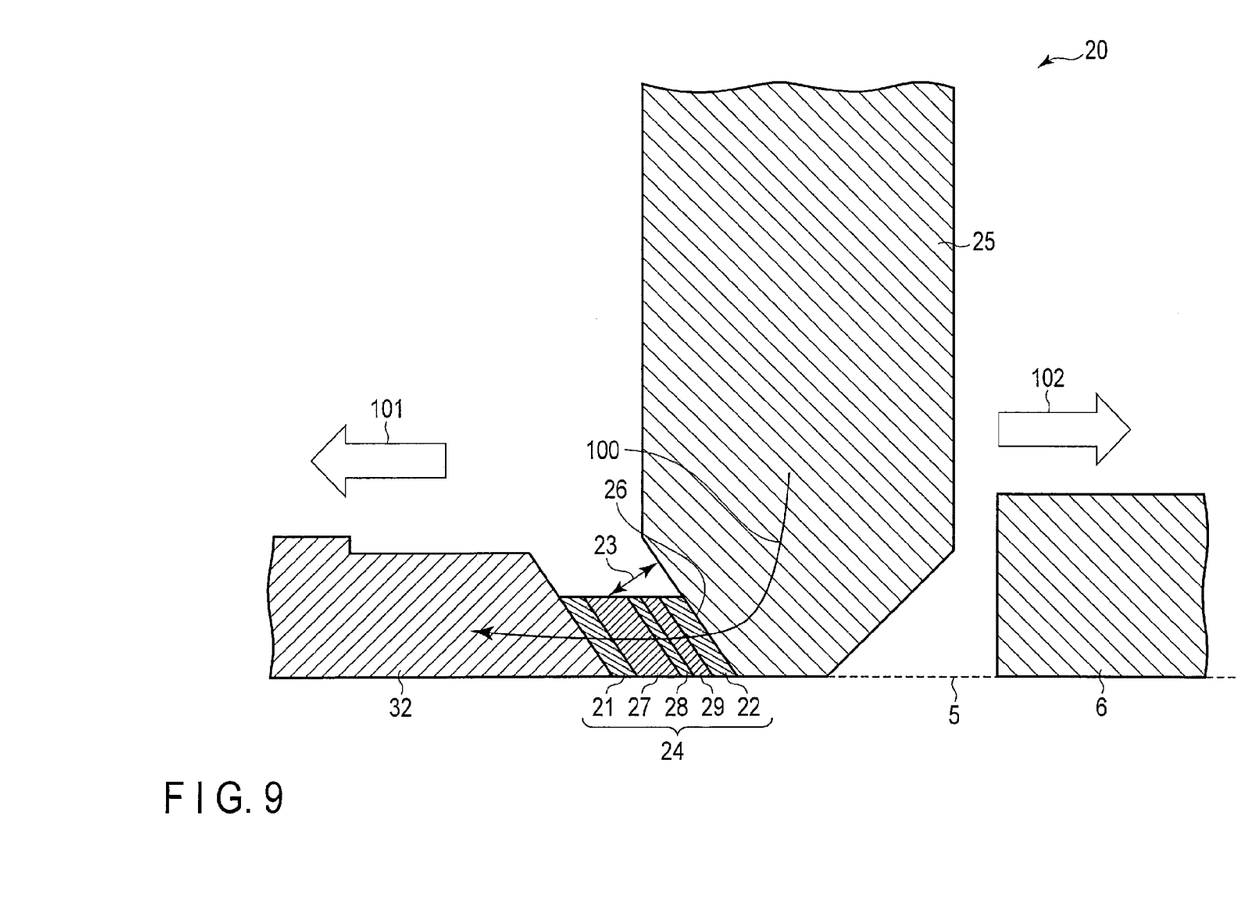
FIG. 9 is a cross-sectional view of another example of a magnetic head of the embodiment, as focusing on an air bearing surface.

FIG. 9 is a cross-sectional view of another example of a magnetic head of the embodiment, focusing on an air bearing surface.

In the proximity of an air bearing surface 5, a main pole 25 has a surface 26 at a trailing direction 101 side tapering toward the air bearing surface. An STO 24 including a spin injection layer 29, intermediate layer 28, and oscillation layer 27, STO electrodes 21 and 22 at both sides of the STO 24, and trailing shield 32 on the STO electrode 21 are tapered as with the surface 26. The other structure is the same as in FIG. 2. With such a structure applied to the main pole 25, magnetic flux concentration is improved at the tip of the main pole 25, and higher recording density is achievable. A recording head with such a write gap structure is defined as a tapered recording head. Furthermore, auxiliary poles (not shown) may be included therein as in Example 1. The STO 24 is provided between the main pole 25 and the trailing shield 32, and a magnetic easy axis direction of the SIL 29 is set substantially perpendicular to the opposite surface of the main pole as indicated by arrow 23.

Using the following condition, a study was performed in simulation.

A distance between the main pole and the trailing shield (write gap) was set to 30 nm. The write gap is defined as a dimension normal to the tapered surface between the main pole and the trailing shield. Here, a gap field applied to the film thickness direction of the FGL (field strength in the write gap) was 11 kOe.

Figure 10:
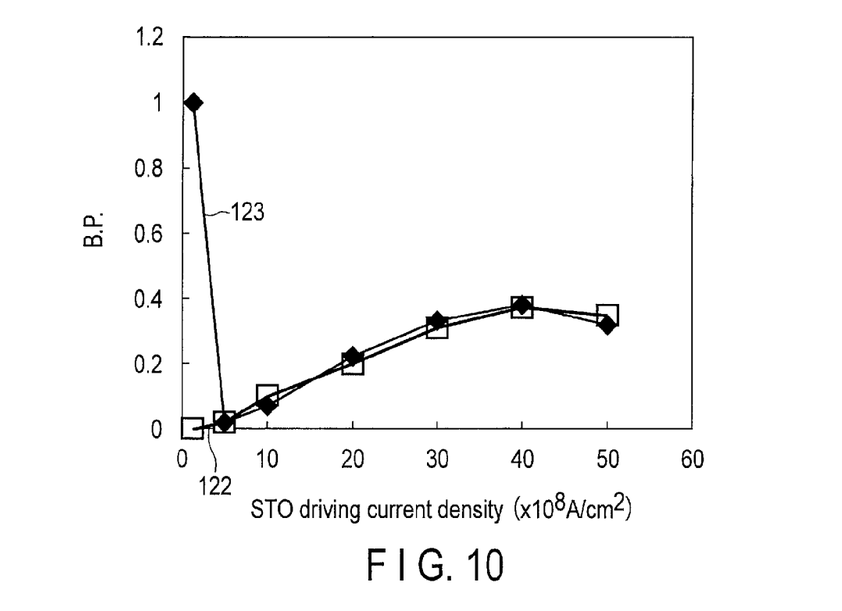
FIG. 10 shows how B.P. depends on STO driving current density as to the magnetic head of the embodiment.
Figure 11:
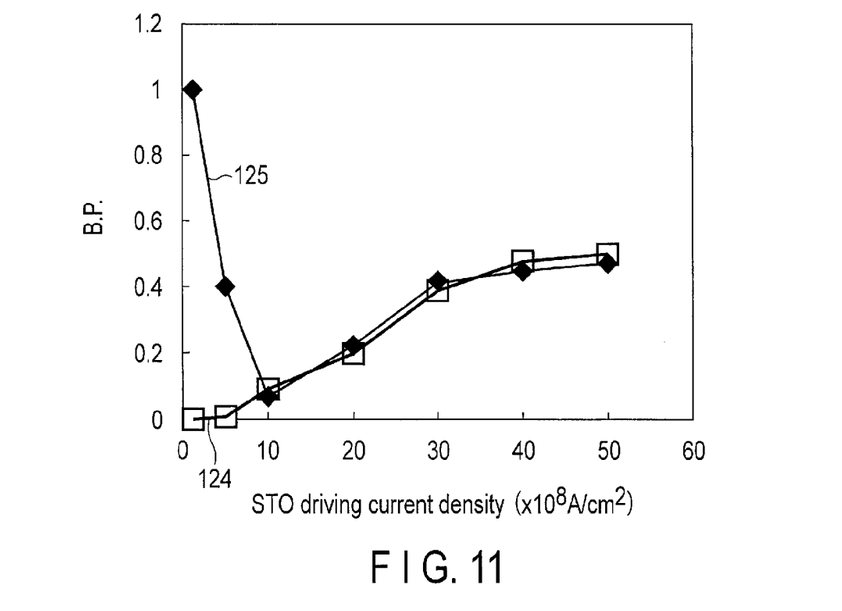
FIG. 11 shows how B.P. depends on STO driving current density as to the magnetic head of the embodiment.

FIGS. 10 and 11 show how B.P. depends on the STO driving current density as to the magnetic head of Example 2.

FIG. 10 shows graphs where Hk of the SIL is 22 kOe and WG is 30 nm. Recording current with respect to the initial magnetization direction of the SIL is positive in graph 122 while it is negative in graph 123.

FIG. 11 shows graphs where Hk of the SIL is 30 kOe and WG is 30 nm. Recording current with respect to the initial magnetization direction of the SIL is positive in graph 124 while it is negative in graph 125.

Figure 12:
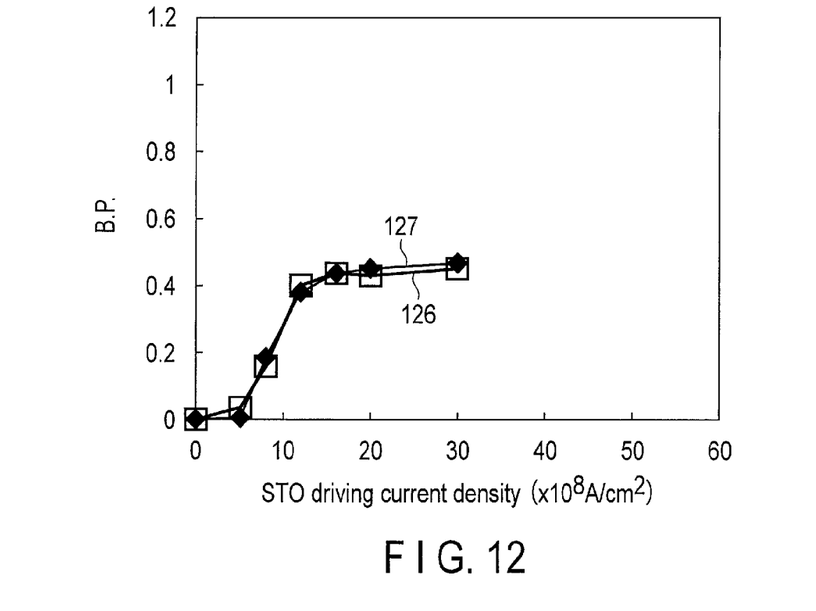
FIG. 12 shows a relationship between STO driving current density and B.P. as to a magnetic head of a comparative example.
Figure 13:
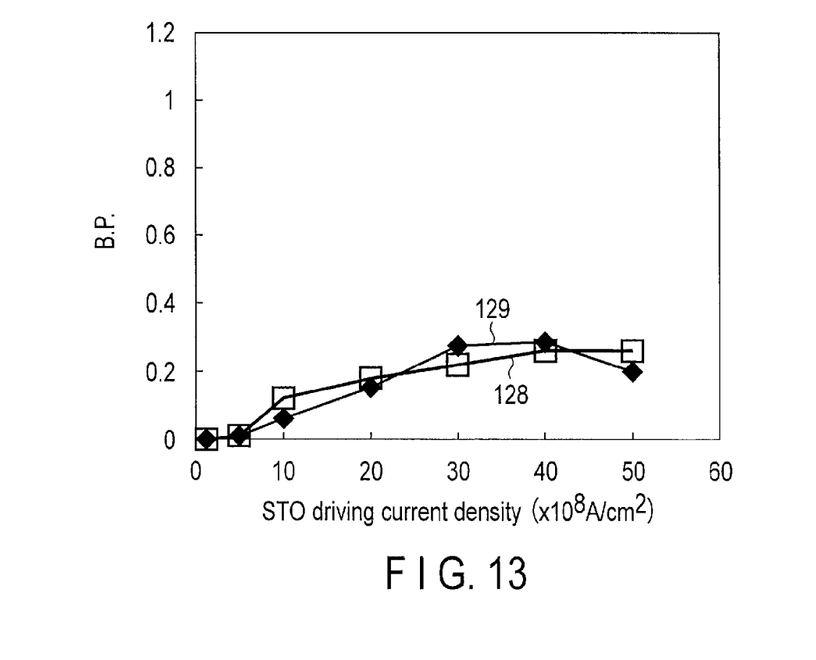
FIG. 13 shows a relationship between STO driving current density and B.P. as to a magnetic head of a comparative example.

Furthermore, for comparison purpose, a magnetic head with the same structure as in FIG. 9 except that Hk of the SIL is 15 kOe and WG is 45 nm was prepared as comparative example 3, and a magnetic head with the same structure as in FIG. 9 except that Hk is 15 kOe was prepared as comparative example 4. FIGS. 12 and 13 show how B.P. depends on the STO driving current density as to the magnetic heads of comparative examples 3 and 4.

In FIG. 12, recording current with respect to the initial magnetization direction of the SIL is positive in graph 126 while it is negative in graph 127.

In FIG. 13, recording current with respect to the initial magnetization direction of the SIL is positive in graph 128 while it is negative in graph 129.

Results are similar to those obtained in Example 1. That is, with the structure of the embodiment, if the STO driving current density is substantially zero, B.P. becomes either zero or 1 depending on polarity of recording current, and B.P. then decreases as the STO driving current density increases. The STO driving current density continues to increase, and B.P. finally becomes substantially the same regardless of polarity of recording current. Furthermore, comparing FIG. 11 to FIG. 12, when the STO of the embodiment is applied to a recording head having a narrow write gap which allows a high recording density, the STO oscillation of high efficiency can be performed and high recording density can be achieved.

Figure 14:
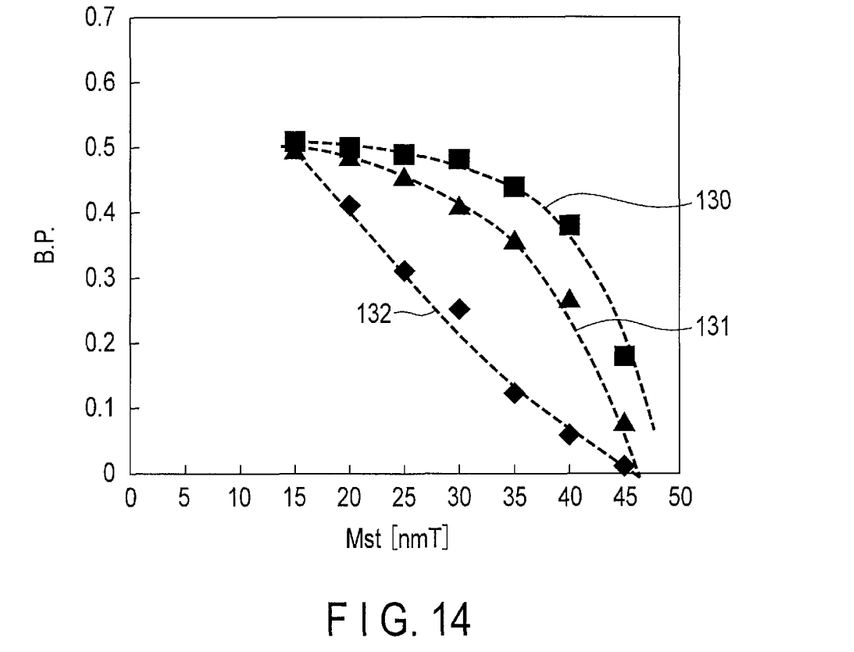
FIG. 14 shows a relationship between FGL magnetic film thickness and resulted B.P. of the magnetic head of the embodiment.

FIG. 14 shows how B.P. changes with respect to the magnetic film thickness of the FGL as to the tapered recording heads of Example 2.

Graph 130 shows a case where Hk of the SIL is 30 kOe and WG is 30 nm and graph 131 shows a case where Hk of the SIL is 22 kOe and WG is 30 nm. Furthermore, for comparison purpose, graph 132 shows a case where Hk of the SIL is 15 kOe and WG 30 nm.

As with Example 1, with the magnetic head structure of the embodiment, the improvement in B.P. is acknowledged in a wide range. For example, if Hk of the SIL is 15 kOe as shown by graph 132, a good oscillation performance is not obtained in an FGL magnetic film thickness (Mst) range between 25 and 40 nmT. On the other hand, if Hk of the SIL is 30 kOe as shown by graph 130, B.P.≥0.35 is acknowledged in the same FGL magnetic film thickness (Mst) range.

Example 3

Change in Recording Current Dependency of STO Resistance by STO Driving Current

Since the STO device resistance of the embodiment changes depending on B.P., an occurrence of SIL reversal and STO driving current necessary for mag-flip can be understood by observing the recording current dependency of B.P.

Figure 15:
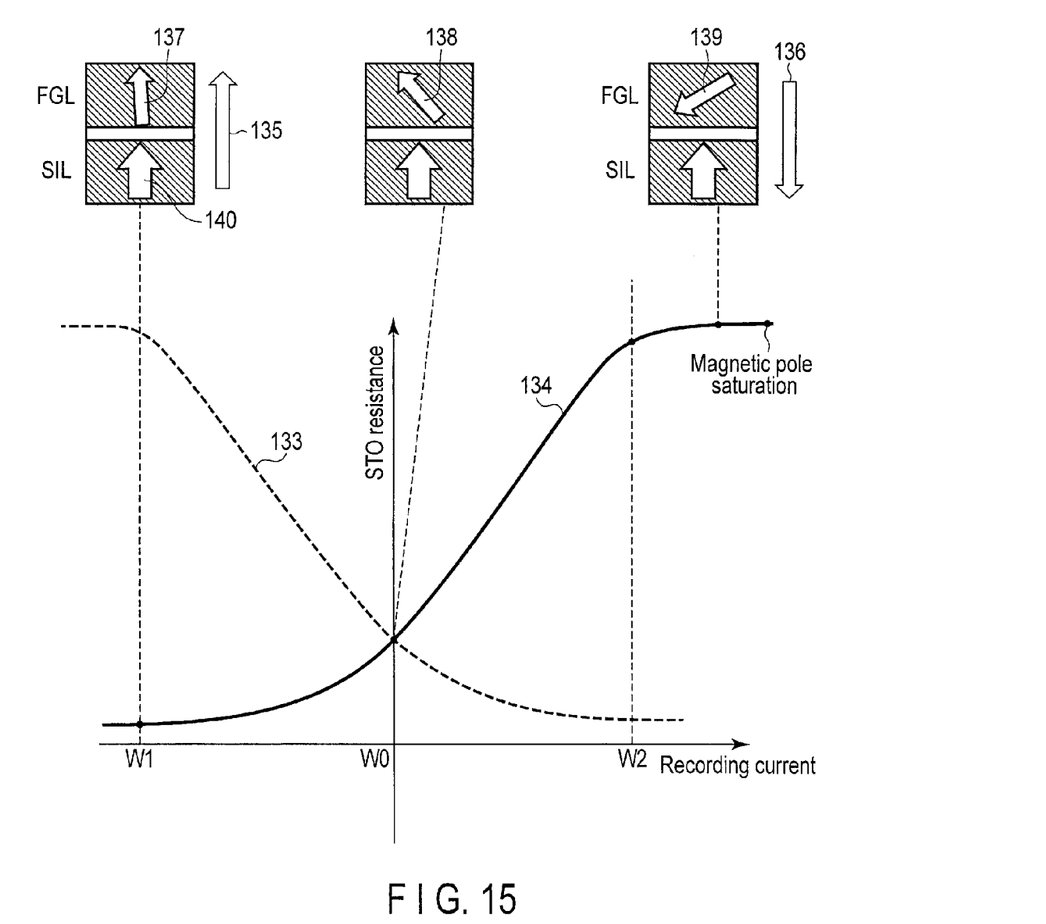
FIG. 15 shows an example of a change of STO device resistance with respect to recording current when STO driving current density is substantially zero.

FIG. 15 shows an example of a change of STO device resistance with respect to recording current when STO driving current density is substantially zero.

Figure 16:
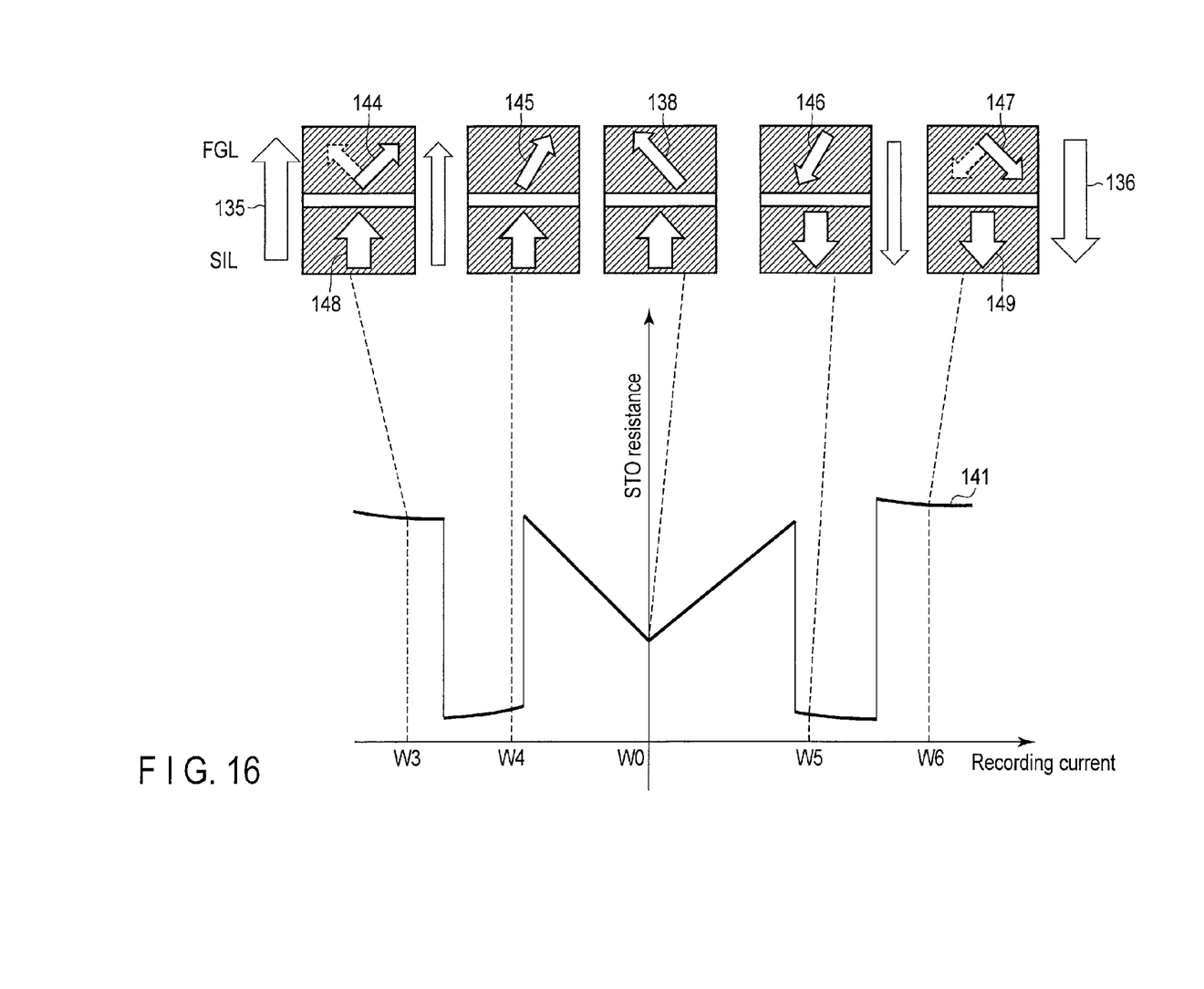
FIG. 16 shows an example of a change of STO device resistance with respect to recording current when STO oscillates by STO driving current supplied thereto.

FIG. 16 shows a change of STO device resistance with respect to recording current when STO oscillates by STO driving current. Here, the driving current of the STO constantly flows in the same direction (in this example, a direction of electron flow from the FGL to the SIL).

The structure of the magnetic head used in this measurement is the same as that of FIG. 2.

In the magnetic head structure of the embodiment, if the STO driving current density is substantially zero, the STO device resistance changes monotonously as changing the value of recording current as indicated by solid line graph 134 in FIG. 15, excluding a resistance change by Joule heat. The STO device resistance becomes substantially constant when the main pole becomes saturated as the recording current increases.

The monotonous change of the STO resistance is caused by the magnetic resistance effect based on the magnetization behavior of the FGL. Arrow 137 shows a magnetization condition of the FGL when recording current is W1 in graph 134. Arrow 138 shows a magnetization condition of the FGL when recording current is W0 in graph 134. Arrow 139 shows a magnetization condition of the FGL when recording current is W2 in graph 134.

If recording current increases to enlarge the gap field in the direction indicated by arrow 135 as being substantially parallel to the initial magnetization direction 140 of the SIL, the magnetization of the FGL changes, as indicated by arrow 137, such that a relative angle to the magnetization direction 140 of the SIL reduces, and the STO resistance monotonously decreases. If recording current increases to enlarge the gap field to be substantially antiparallel to the magnetization direction 140 of the SIL as indicated by arrow 136, the magnetization of the FGL changes as indicated by arrow 139 such that a relative angle to the magnetization direction 140 of the SIL increases and the STO resistance monotonously increases. From the above, when the STO driving current density is substantially zero, a resistance change asymmetric to the polarity of recording current appears as graph 134. Note that if the initial magnetization direction 140 of the SIL is reversed, a monotonous STO resistance having a reverse polarity to graph 134 appears as indicated by a dotted line graph 133.

Furthermore, in FIG. 16, arrow 144 shows a magnetization condition of the FGL when recording current is W3. Arrow 145 shows a magnetization condition of the FGL when recording current is W4. Arrow 146 shows a magnetization condition of the FGL when recording current is W5. Arrow 147 shows a magnetization condition of the FGL when recording current is W6.

With the magnetic head structure of the embodiment, if the STO driving current density increases to allow the magnetization reversal of the SIL, the STO device resistance decreases as W0 to W4 or W0 to W5 in FIG. 16. Furthermore, if the STO oscillation is achieved, a resistance change occurs as in the proximity to W3 or W6 in the figure. Recording current which generates such a resistance change is less than recording current which saturates the main pole as in FIG. 15.

When the STO driving current density increases, spin transfer torque is generated between electrons flowing from the FGL to the SIL and the SIL magnetization. The spin transfer torque causes the actual coercive force of the SIL to decrease and the magnetization reversal of the SIL is achieved. As above, by measuring the recording current dependency of the STO resistance while changing the STO driving current, a good STO driving current can be selected.

Note that, even if a tapered recording head shown in FIG. 9 is used, the STO driving current necessary for mag-flip and oscillation can be selected by measuring the recording current dependency of the STO resistance while changing the STO driving current as mentioned above.

Example 4

Write Gap and STO Film Thickness

Figure 17:
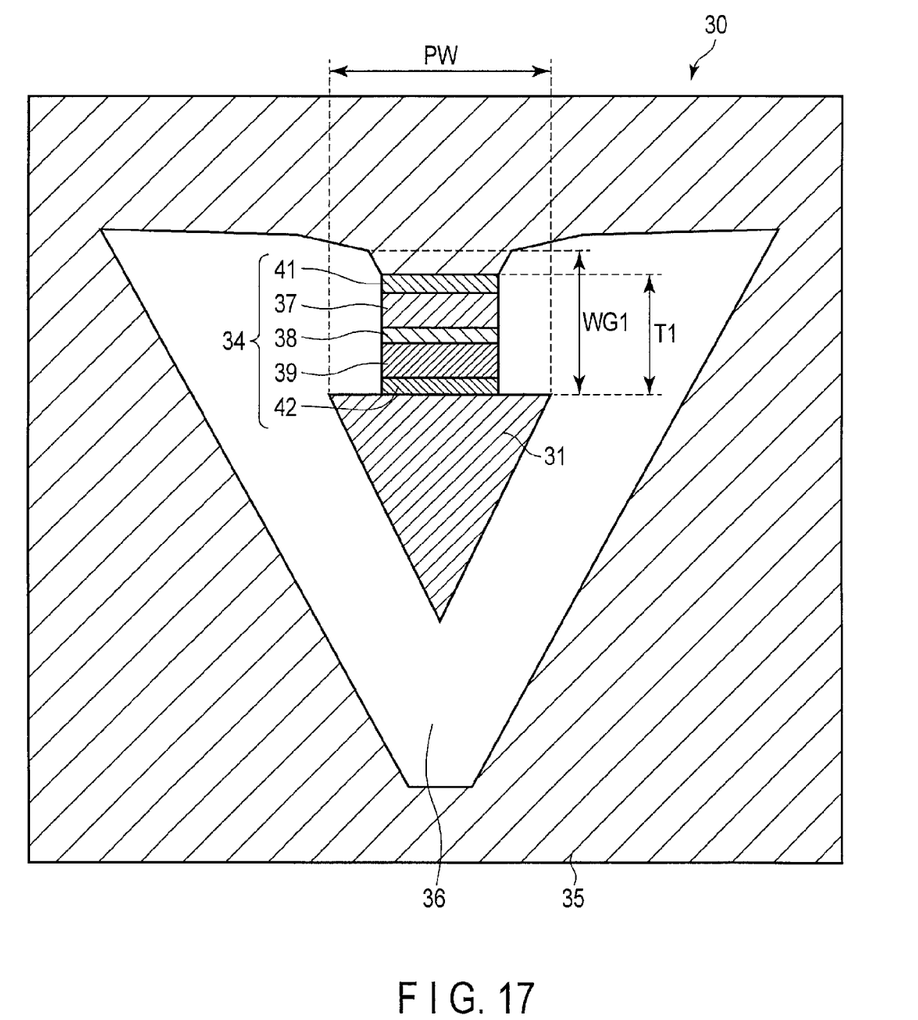
FIG. 17 shows still another example of a magnetic head of the embodiment as being viewed from an air bearing surface.

FIG. 17 shows still another example of a magnetic head of the embodiment as being viewed from an air bearing surface.

As shown, a magnetic head 30 includes a main pole 31, auxiliary pole 35 formed around the main pole 31 with a nonmagnetic insulating layer 36 interposed therebetween, and STO 34 driven by current from a power source (not shown) supplied between the main pole 31 near the air bearing surface and a trailing direction of the auxiliary pole 35. The STO 34 includes an electrode 42, SIL 39, intermediate layer 38, FGL 37, and electrode 41 layered in this order from the main pole 31 side. This layering order may be reversed.

Furthermore, the magnetic head 30 has an average write gap WG1 (a write gap averaged by a width PW in FIG. 17) which is greater than a film thickness T1 of the STO 34. In the embodiment, since the write gap is greater than the film thickness of the STO, oscillation with higher efficiency can be achieved.

An STO oscillation state was studied in simulation using a combination of the flat type write gap structure of Example 1 and a write gap greater than the STO film thickness.

Figure 18:
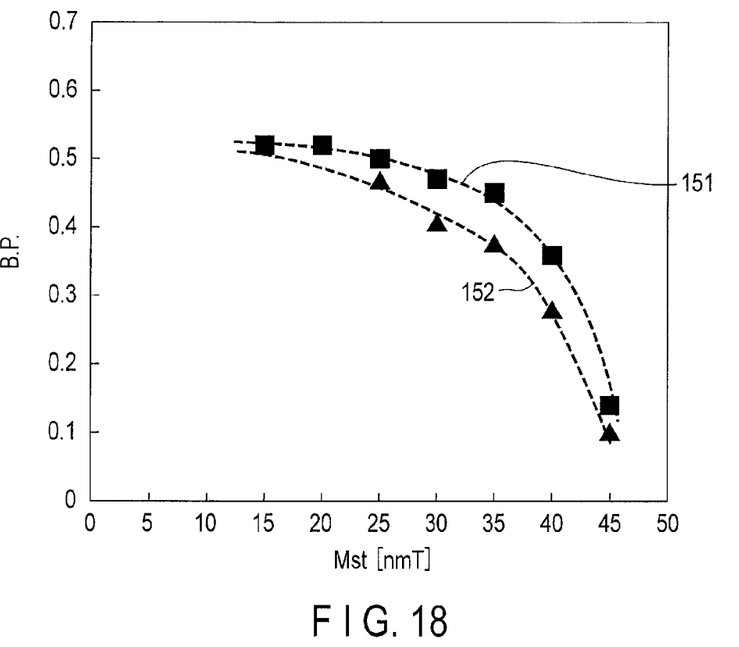
FIG. 18 shows how B.P. depends on FGL magnetic film thickness when STO driving current density takes an optimum value as to the magnetic head of the embodiment.
Figure 19:
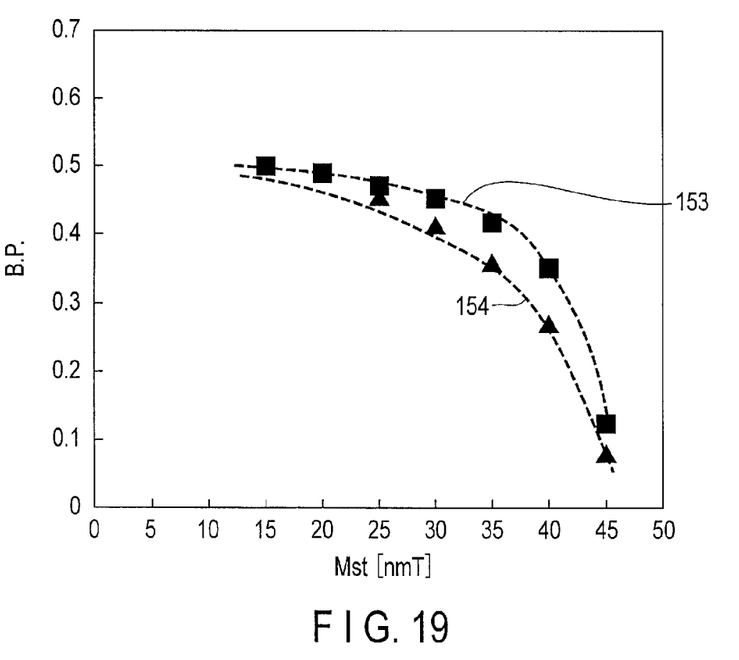
FIG. 19 shows how B.P. depends on FGL magnetic film thickness when STO driving current density takes an optimum value as to the magnetic head of the embodiment.

As to the combination of the flat type write gap structure of Example 1 and a write gap greater than the STO film thickness, FIG. 18 shows how B.P. depends on the FGL magnetic film thickness while the STO driving current density takes an optimum value acquired from the simulation. Note that an average write gap is 33.2 nm and anisotropy field Hk of the SIL is 22 kOe. The STO structure used is the same as that of Example 1. Graph 151 shows a case where an average write gap is greater than the film thickness of the SIL and graph 152 shows a case where an average write gap is equal to the film thickness of the SIL (as in Example 1). With the average write gap being greater than the film thickness of the STO, higher B.P. in a wider range is achieved. Here, even if the SIL of which Hk is 22 kOe is used, B.P. above 0.35 is acknowledged in a range between 25 and 40 nmT as with Example 1 where Hk of the SIL is 30 kOe. Similarly, as to a combination of a tapered write gap structure of Example 2 and a write gap greater than the STO film thickness, FIG. 19 shows how B.P. depends on the FGL magnetic film thickness while the STO driving current density takes an optimum value acquired from the simulation.

An average write gap is 33.2 nm and the same STO structure as above is used. Note that Hk of the SIL is 22 kOe. With an average write gap being greater than the SIL film thickness, much higher B.P. in a wider range is acknowledged in the tapered write gap structure. Apparently, a range between 25 and 40 nmT of the FGL magnetic film thickness which shows B.P. of less than 0.35 where Hk=15 kOe and WG is 30 nm can achieve B.P. of above 0.35 with this average write gap.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A microwave assisted magnetic head comprising:
a main pole;
an auxiliary pole opposed to the main pole;
a coil which magnetizes the main pole and the auxiliary pole;
a spin torque oscillator provided between the main pole and the auxiliary pole; and
a terminal which supply electricity to the spin torque oscillator, wherein
the spin torque oscillator includes a spin injection layer formed on either the main pole or the auxiliary pole, an intermediate layer formed on the spin injection layer, and an oscillation layer formed on the intermediate layer, and
a magnetization direction of the spin injection layer is identical regardless of polarity of a recording current if a driving current of the spin torque oscillator is zero, and the magnetization direction of the spin injection layer changes in response to the polarity of the recording current if the driving current of the spin torque oscillator is not zero.

2. The microwave assisted magnetic head of claim 1, wherein magnetization reversal is possible in response to polarity reversal of the recording current occurred by increase of the driving current of the spin torque oscillator.

3. The microwave assisted magnetic head of claim 1, wherein a magnetic resistance change of the spin torque oscillator by a magnetic resistance effect is asymmetric with respect to the polarity of the recording current if the driving current of the spin torque oscillator is zero, and the magnetic resistance change of the spin torque oscillator by the magnetic resistance effect becomes symmetric with respect to the polarity of the recording current by supplying the driving current to the spin torque oscillator.

4. The microwave assisted magnetic head of claim 1, wherein a normal of a surface of the main pole opposite to the spin torque oscillator and a magnetic easy axis direction of the spin torque oscillator are parallel to each other.

5. The microwave assisted magnetic head of claim 1, wherein polarity of the driving current of the spin torque oscillator is constantly the same.

6. The microwave assisted magnetic head of claim 1, wherein an average value of a distance between the main pole and a trailing shield opposed to the main pole, as being viewed from an air bearing surface side, is greater than a film thickness of the spin torque oscillator.

7. The microwave assisted magnetic head of claim 1, wherein the product of saturation magnetization and film thickness of the oscillation layer of the spin torque oscillator is in a range between 25 and 40 nmT.

8. The microwave assisted magnetic head of claim 1, wherein the spin injection layer includes an alloy containing manganese and having perpendicular magnetic anisotropy.

* * * * *